United States Patent
Deppe et al.

(10) Patent No.: US 7,032,963 B2
(45) Date of Patent: Apr. 25, 2006

(54) MOTOR VEHICLE ROOF WITH A WIND DEFLECTOR ELEMENT WITH A SPOILER BODY AND PROCESS FOR PRODUCTION THEREOF

(75) Inventors: Michael Deppe, Munich (DE); Robert Koch, Langerringen (DE); Roland Hahn, Germering (DE); Rudolf Schröder, Munich (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 10/833,351

(22) Filed: Apr. 28, 2004

(65) Prior Publication Data

US 2005/0001459 A1  Jan. 6, 2005

(30) Foreign Application Priority Data

Apr. 30, 2003  (DE) ............... 103 19 506

(51) Int. Cl.
*B60J 7/22* (2006.01)
(52) U.S. Cl. ............. 296/217; 296/216.06; 296/216.09
(58) Field of Classification Search ........... 296/216.06, 296/216.09, 217
See application file for complete search history.

(56) References Cited

U.S. PATENT DOCUMENTS

| | | | | |
|---|---|---|---|---|
| 4,296,962 A | * | 10/1981 | Jardin et al. ................ | 296/217 |
| 5,018,782 A | * | 5/1991 | Fiegel et al. ................ | 296/217 |
| 5,052,745 A | * | 10/1991 | Preiss .......................... | 296/217 |
| 5,609,388 A | * | 3/1997 | Hattass et al. .............. | 296/217 |
| 5,660,429 A | * | 8/1997 | Wienchol ..................... | 296/217 |
| 6,234,567 B1 | * | 5/2001 | Melchger ................. | 296/180.1 |
| 6,520,570 B1 | * | 2/2003 | Schatzler ............... | 296/216.01 |
| 6,540,289 B1 | * | 4/2003 | Bergmiller et al. .... | 296/216.09 |
| 6,793,278 B1 | * | 9/2004 | Weiss et al. ................. | 296/217 |
| 6,837,538 B1 | * | 1/2005 | Itoh et al. .............. | 296/216.06 |

FOREIGN PATENT DOCUMENTS

| | | |
|---|---|---|
| DE | 1 480 470 | 9/1969 |
| DE | 37 22 361 C2 | 7/1989 |
| DE | 39 42 676 A1 | 6/1990 |
| DE | 40 33 027 A1 | 4/1992 |
| DE | 195 10 822 A1 | 9/1996 |
| DE | 198 19 680 C1 | 9/1999 |
| DE | 100 13 433 A1 | 9/2001 |
| DE | 100 36 816 A1 | 2/2002 |
| DE | 101 34 438 A1 | 2/2003 |
| DE | 101 55 170 A1 | 6/2003 |
| JP | 11-198660 | * 7/1999 |

* cited by examiner

*Primary Examiner*—Dennis H. Pedder
(74) *Attorney, Agent, or Firm*—David S. Safran

(57) ABSTRACT

A motor vehicle roof with a wind deflector element (20) which can be raised with its rear edge area (16) and a covering arrangement which is located behind the wind deflector element for selective joint closing and at least partial clearance of a roof opening, the wind deflector element having a spoiler body (10) for preventing unwanted air flow noise when the covering arrangement is open. The spoiler body (10) is foamed onto the wind deflector element (20) via a peripheral foaming production process.

13 Claims, 3 Drawing Sheets

MOTOR VEHICLE ROOF WITH A WIND DEFLECTOR ELEMENT WITH A SPOILER BODY AND PROCESS FOR PRODUCTION THEREOF

BACKGROUND OF THE INVENTION

1. Field of the Invention

This invention relates to a motor vehicle roof with a wind deflector element which can be raised at its rear edge area and a covering arrangement which is located behind the wind deflector element for optional joint closing or at least partial clearance of a roof opening, the wind deflector element having a spoiler body for preventing unwanted air flow noise when the covering arrangement is open, and to a process by which it is produced.

2. Description of Related Art

Openable motor vehicle roofs, with a roof opening which can be closed by a cover, especially a glass cover, have been known for a long time. Ordinarily, these openable motor vehicle roofs are provided with a wind deflector for preventing wind noise. One example thereof can be found in published German Patent Application DE 1 480 470. These wind deflectors are used to protect the vehicle passengers against the air flow and against disturbing wind noise. However, it has been shown that while driving with the sliding roof opened, in spite of these wind deflectors, disturbing noise (often also called "hum") and pressure differences arise in the vehicle interior which are caused by resonance effects and the resulting pulsation of the air column in the vehicle interior. The resulting noise and pressure differences in the passenger space are often regarded as a serious nuisance. To prevent this humming noise in the passenger compartment, various spoiler bodies (which are also called "diffusors") have been developed; they are mounted in the area of the front edge of the roof opening or on the wind deflectors.

Thus, for example, published German Patent Application DE 38 42 676 A1 shows a spoiler body on a wind deflector which in the raised operating position of the wind deflector projects up over it and prevents the occurrence of disturbing hum. A similar spoiler body is shown in published German Patent Application DE 40 33 027 which, however in this case, is not mounted on a wind deflector, but is located in front of the forward edge of the roof opening.

The disadvantage in these known spoiler bodies is that they must be mounted in an additional working step (for example, cemented) on the wind deflector element or on the forward roof edge, for example. This process requires additional procedures, for example, for cleaning and cementing, and additional material costs for cleaners, cements and primers. Moreover, this separate spoiler body often appears visually as a foreign body on the wind deflector element.

An additional spoiler body to prevent humming noise is disclosed by published German Patent Application DE 195 10 822 A1, which describes a generic motor vehicle roof, the spoiler body being made there integrally with a raisable, glass or plastic front cover of a roof opening which can be closed by several successively arranged covers or being made as a component which is permanently connected to the front cover. The disadvantage in this integral execution of the spoiler body with the front cover is the relatively complex fabrication which is required therein.

SUMMARY OF THE INVENTION

A primary object of this invention is to devise a motor vehicle roof with a wind deflector element in which the spoiler body can be easily integrated without additional working steps or significantly increased material costs, and to a production process by which such a motor vehicle roof can be produced.

This object is achieved in accordance with the invention by a motor vehicle roof in which the spoiler body is foamed onto the wind deflector element. In the approach according to the invention, it is advantageous that, because the spoiler body is foamed onto the wind deflector element, in wind deflector elements which are foamed around the edge for sealing purposes, the spoiler body can be easily integrated into this foam around the edge without additional working steps. Additional attachment processes, such as, for example, for cleaning, cementing, etc., are thus unnecessary, there is no added parts cost and additional installation costs can also be avoided. Furthermore, the spoiler body can no longer become loose because fastenings are eliminated, and a more harmonic appearance can be achieved since the spoiler body no longer visually appears as a foreign body on the wind deflector element.

The invention is explained in detail below with reference to the accompanying drawings which show preferred embodiment by way of example.

DETAILED DESCRIPTION OF THE INVENTION

Figure 1:
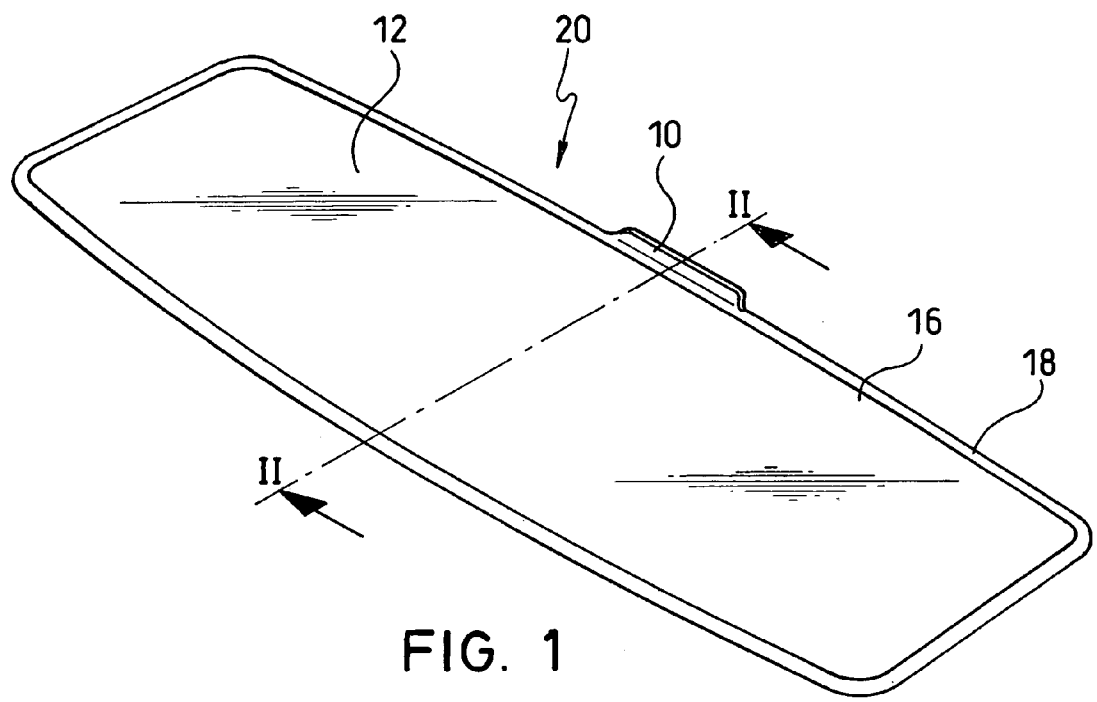
FIG. 1 is a perspective view from above a wind deflector louver in accordance with the invention, on the right half of the wind deflector louver in the figure, a foaming around the edge with an integrated spoiler body (diffusor) being shown.
Figure 2:
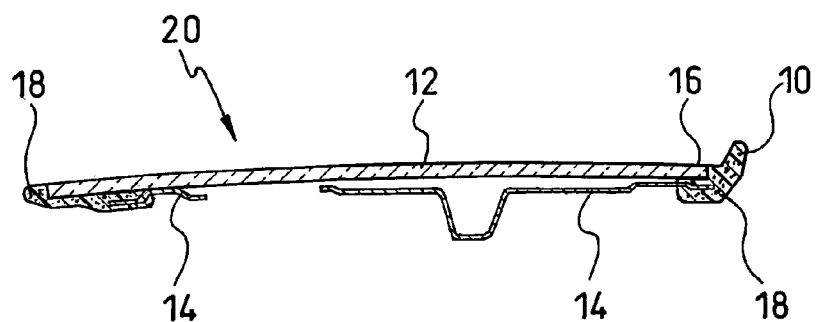
FIG. 2 is a sectional view of the wind deflector louver taken along line II—II in FIG. 1.
Figure 3:
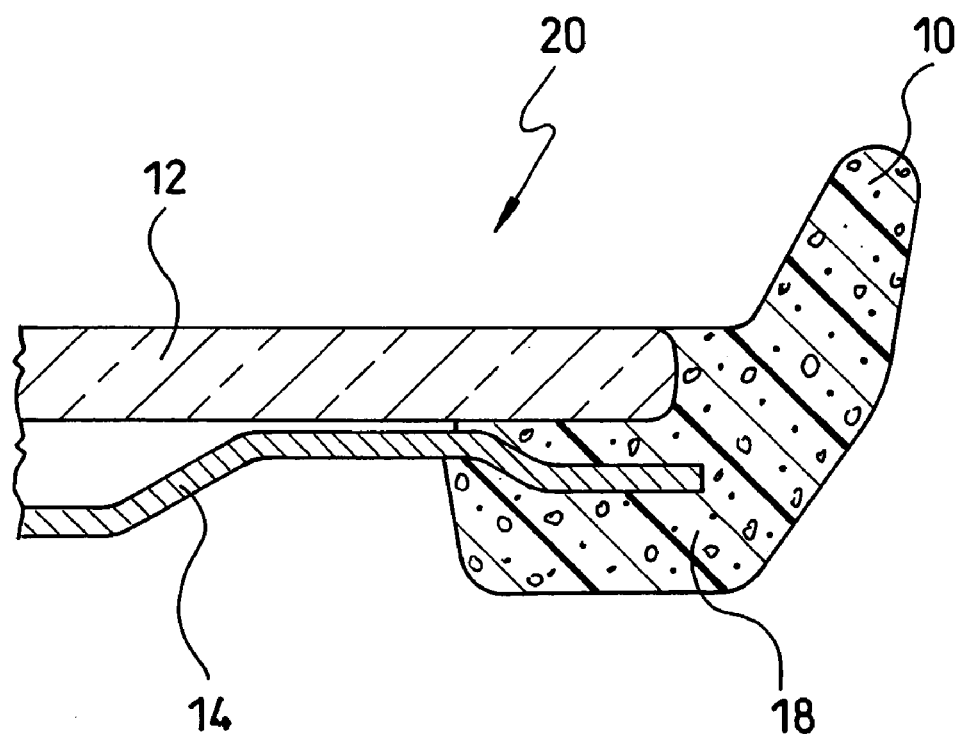
FIG. 3 is an enlarged cross-sectional view of the rear area of the wind deflector louver with the integrated spoiler body.
Figure 4:
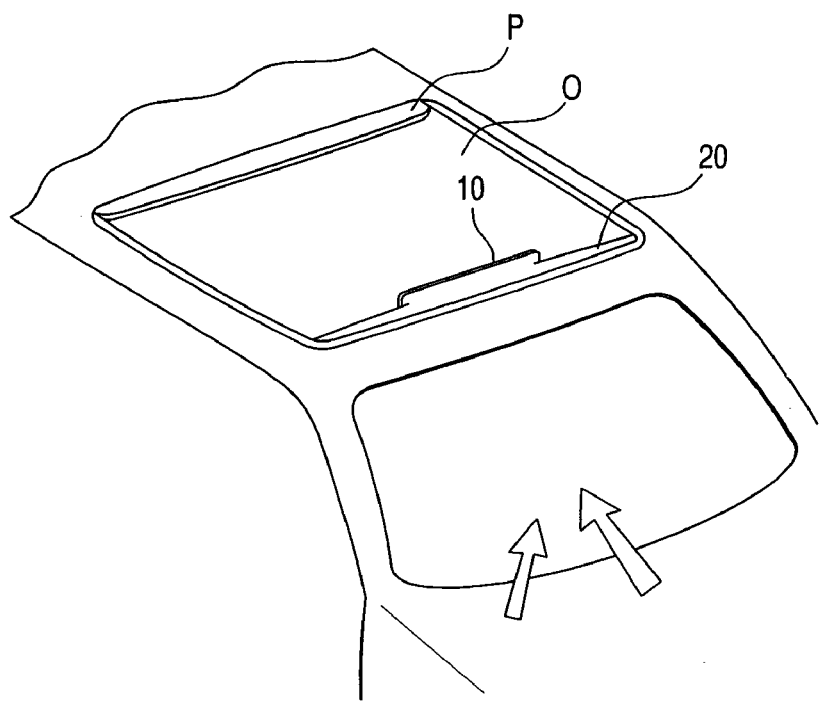
FIG. 4 shows a motor vehicle roof with a wind deflector element in accordance with the invention in a raised position and a covering arrangement located behind the wind deflector element.

FIG. 1 shows a wind deflector louver 20 in accordance with the invention that is part of an openable motor vehicle roof, especially for passenger vehicles, the wind deflector louver 20 being located on the front edge of the roof opening which can be closed jointly by the wind deflector louver 20 and another covering arrangement located behind it, such as, for example, one or more displaceable covers, especially glass covers, or a louvered roof. In this position, the wind deflector louver 20 is essentially horizontal. When the covering arrangement is opened in order to clear the rear part of the roof opening, the wind deflector louver 20 is raised at its rear edge in order to act as a wind deflector. Embodiments are also possible in which the wind deflector louver 20 can be raised with the covering arrangement closed. The overall construction of such roofs and the manner in which the wind deflector louver and displaceable covers are well known and by themselves form no part of this invention, a wind deflector louver in accordance with the invention being usable in place of the wind deflector louver of any such known roof. In this regard, FIG. 4 shows a generic motor vehicle roof having a wind deflector louver 20 at the front end of a roof opening O and a covering arrangement in the form of a slidable cover panel P that is shown in an open position retracted under the rear fixed roof area.

The body of the wind deflector louver 20 is formed by a sheet or plate 12 which has a body of foam 18 peripherally foamed onto its edge area 16 extending around the edge. Reinforcing elements 14 are partially embedded into the foam 18 at their edge area. The plate 12 is, for example, produced from a transparent material, for example, plastic, heat treated glass (ESG) or laminated safety glass. The reinforcing elements 14 are used to maintain the shape of the wind deflector louver 20 even at high driving speeds and with the associated forces which act on the louver 20. These reinforcing elements 14 can be produced, for example, from steel sheets, and moreover, are used to support the actuating elements for moving the wind deflector louver.

The foam 18 around the edge can be produced, for example, by peripheral foaming with polyurethane (PU). The reinforcing element 14, during the foaming process, is moved into a cavity between the foaming tool and the plate 12 and is embedded in the foame at the same time. In the peripheral foaming process, this cavity is filled with foam.

As is furthermore shown in FIG. 1, a spoiler body or diffusor 10 is integrated into the body of foam 18 by giving part of the foam 18 around the edge a diffusor shape. The diffusor 10 is used to prevent unwanted air flow noise when the covering arrangement is opened. The extension of the diffusor 10 transversely to the direction of travel is relatively short compared to the width of the wind deflector louver or plate 12 in this direction.

When the wind deflector louver is produced, preferably a foaming tool is used which is shaped such that the negative shape of the diffusor 10 is reproduced in the foaming tool. Together with the body foam 18, the diffusor 10 is thus made in a single foaming process and is foamed onto the plate 12.

What is claimed is:

1. Motor vehicle roof with a wind deflector element which is raisable at a rear edge area thereof and a covering arrangement which is located behind the wind deflector element for closing and at least partial clearance of a roof opening, the wind deflector element located on a front edge of the roof opening and having a spoiler body extending upward from the deflector element to above the covering arrangement for preventing unwanted air flow noise when the covering arrangement is open, wherein the spoiler body is positioned at the front edge of the covering arrangement and is part of a body of foam that has been foamed onto a peripheral edge area the wind deflector element.

2. Motor vehicle roof as claimed in claim 1, wherein the spoiler body is formed located only in a middle portion of a rear edge area of the wind deflector element.

3. Motor vehicle roof as claimed in claim 2, wherein the spoiler body projects up from the rear edge of the wind deflector element.

4. Motor vehicle roof as claimed in claim 1, wherein the wind deflector element is a wind deflector louver.

5. Motor vehicle roof as claimed in claim 1, wherein the wind deflector element comprises a plate-shaped body around the edge of which the foam body extends surrounding the edge area of the plate-shaped body.

6. Motor vehicle roof as claimed in claim 5, wherein the spoiler body and the body of foam are formed as a single foam body.

7. Motor vehicle roof as claimed in claim 5, wherein the plate-shaped body is formed of transparent plastic or glass.

8. Motor vehicle roof as claimed in claim 5, wherein at least one reinforcing element has an edge area which is embedded in the foam body.

9. Motor vehicle roof as claimed in claim 8, wherein the reinforcing element is a sheet metal section.

10. Motor vehicle roof as claimed in one of the preceding claims, wherein the spoiler body and the body of foam are made of polyurethane.

11. Process for producing a roof assembly for a motor vehicle roof having a the wind deflector element which is raisable at its rear edge area and a covering arrangement which is located behind the wind deflector element for closing and at least partial clearance of a roof opening, comprising the step of foaming a spoiler body onto the wind deflector element so as to extend upward from a rear edge of the wind deflector element, and positioning the spoiler body at the front edge of the covering arrangement the spoiler body preventing unwanted air flow noise when the covering arrangement is open onto the wind deflector element.

12. Process as claimed in claim 11, wherein said deflector element is formed of a plate-shaped body and a body of foam peripherally foamed around the edge plate-shaped body using a foaming tool which is has negative shape of the body of foam and the spoiler body, in a single foaming process.

13. Process as claimed in claim 12, wherein at least one reinforcing element is inserted into the foaming tool and an edge area thereof embedded into the body of foam during the foaming step.

* * * * *